(12) United States Patent
Weinsberg et al.

(10) Patent No.: US 9,811,319 B2
(45) Date of Patent: Nov. 7, 2017

(54) SOFTWARE INTERFACE FOR A HARDWARE DEVICE

(71) Applicant: Microsoft Technology Licensing, LLC, Redmond, WA (US)

(72) Inventors: Yaron Weinsberg, Jerusalem (IL); Jinsong Yu, Bellevue, WA (US); Maxim Grabarnik, Mevaseret Tzion (IL); Davide Massarenti, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 226 days.

(21) Appl. No.: 13/734,712

(22) Filed: Jan. 4, 2013

(65) Prior Publication Data

US 2014/0196004 A1 Jul. 10, 2014

(51) Int. Cl.
*G06F 9/44* (2006.01)

(52) U.S. Cl.
CPC .............. *G06F 8/30* (2013.01); *G06F 9/4411* (2013.01)

(58) Field of Classification Search
CPC .................................................. G06F 8/30–8/36
See application file for complete search history.

(56) References Cited

U.S. PATENT DOCUMENTS

| | | | | |
|---|---|---|---|---|
| 6,009,476 | A | * | 12/1999 | Flory ........................ G06F 9/54 719/324 |
| 6,148,346 | A | * | 11/2000 | Hanson .......................... 719/321 |
| 6,202,146 | B1 | | 3/2001 | Slaughter et al. |
| 6,275,857 | B1 | | 8/2001 | McCartney |
| 6,606,669 | B1 | * | 8/2003 | Nakagiri ................ G06F 3/1296 719/327 |
| 7,089,562 | B1 | * | 8/2006 | Kanevsky ............. G06F 9/4411 709/246 |
| 7,562,368 | B2 | * | 7/2009 | Kanevsky ............. G06F 9/4411 709/219 |
| 8,185,783 | B2 | | 5/2012 | Lee et al. |

(Continued)

FOREIGN PATENT DOCUMENTS

| | | |
|---|---|---|
| CN | 1549964 | 11/2004 |
| CN | 1928816 | 3/2007 |

(Continued)

OTHER PUBLICATIONS

Katayama, Tetsuro, Keizo Saisho, and Akira Fukuda. "Proposal of a support system for device driver generation." Software Engineering Conference, 1999.(APSEC'99) Proceedings. Sixth Asia Pacific. IEEE, 1999.*

(Continued)

*Primary Examiner* — Matthew Brophy
(74) *Attorney, Agent, or Firm* — Workman Nydegger

(57) ABSTRACT

Automatically generating code used with device drivers for interfacing with hardware. The method includes receiving a machine readable description of a hardware device, including at least one of hardware registers or shared memory structures of the hardware device. The method further includes determining an operating system with which the hardware device is to be used. The method further includes processing the machine readable description on a code generation tool to automatically generate code for a hardware driver for the hardware device specific to the determined operating system.

20 Claims, 7 Drawing Sheets

(56) References Cited

U.S. PATENT DOCUMENTS

| | | | |
|---|---|---|---|
| 8,200,853 | B2* | 6/2012 | Aull et al. .................. 710/8 |
| 2002/0059473 | A1 | 5/2002 | Oshins et al. |
| 2003/0140179 | A1 | 7/2003 | Wilt et al. |
| 2003/0233487 | A1* | 12/2003 | Ruget et al. ............... 709/321 |
| 2006/0026270 | A1* | 2/2006 | Sadovsky ............ H04L 69/18 709/222 |
| 2006/0034167 | A1 | 2/2006 | Grice et al. |
| 2006/0075119 | A1 | 4/2006 | Hussain et al. |
| 2006/0221372 | A1* | 10/2006 | Onishi et al. .............. 358/1.13 |
| 2006/0248541 | A1* | 11/2006 | Kanevsky ........... G06F 9/4411 719/321 |
| 2007/0011272 | A1 | 1/2007 | Bakke et al. |
| 2007/0094673 | A1* | 4/2007 | Hunt et al. ................. 719/321 |
| 2008/0092148 | A1 | 4/2008 | Moertl et al. |
| 2008/0098208 | A1 | 4/2008 | Reid et al. |
| 2008/0155572 | A1* | 6/2008 | Kolathur et al. ........... 719/327 |
| 2009/0063718 | A1* | 3/2009 | Sekine et al. ................. 710/8 |
| 2009/0064196 | A1* | 3/2009 | Richardson et al. ....... 719/327 |
| 2009/0190150 | A1* | 7/2009 | Selvaraj et al. ............ 358/1.13 |
| 2009/0319701 | A1 | 12/2009 | Mehrotra |
| 2011/0106905 | A1 | 5/2011 | Frey et al. |
| 2012/0092721 | A1* | 4/2012 | Jaudon ................ G06F 3/1204 358/1.15 |
| 2012/0131375 | A1 | 5/2012 | Adda et al. |
| 2012/0246614 | A1* | 9/2012 | Sliwowicz .................. 717/107 |
| 2012/0246635 | A1 | 9/2012 | Kennedy et al. |

FOREIGN PATENT DOCUMENTS

| | | |
|---|---|---|
| CN | 101171573 | 4/2008 |
| CN | 101297280 | 10/2008 |
| CN | 102707983 | 10/2012 |

OTHER PUBLICATIONS

Conway, Christopher L., and Stephen A. Edwards. "NDL: a domain-specific language for device drivers." ACM Sigplan Notices. vol. 39. No. 7. ACM, 2004.*

Chou, Pai H., Ross B. Ortega, and Gaetano Borriello. "The Chinook hardware/software co-synthesis system." System Synthesis, 1995., Proceedings of the Eighth International Symposium on. IEEE, 1995.*

McLemore, et al. "Planning Your Device Driver" Microsoft Inc. Mar. 2011 available at <http://download.microsoft.com/download/2/4/A/24A36661-A629-4CE6-A615-6B2910A1367A/Planning%20Your%20Device%20Driver.pdf>.*

Office Action dated Oct. 23, 2014 cited in U.S. Appl. No. 13/734,718.

Office Action dated Dec. 5, 2014 cited in U.S. Appl. No. 13/734,716.

Forin A., et al., "An I/O System for Mach 3.0", Proceedings of the USENIX Mach Symposium, XX, XX, Jan. 1991, pp. 163-176.

Hongfeng Zhu., et al., "Research and Implementation of Zero-Copy Technology Based on Device Driver in Linux", Computer and Computational Sciences, 2006, IMSCCS '06, First International Multi-Symposiums on Hangzhou, Zhejiang, China, Jun. 2006, pp. 129-134.

Eduard Brose, "ZeroCopy: Techniques, Benefits and Pitfalls", 2005, Retrieved from the Internet at <<http://citeseerx.ist.psu.edu/viewdoc/download?doi=10.1.1.93.9589&rep=rep1&type=pdf>>.

U.S. Appl. No. 13/734,716, filed Jan. 4, 2013, Weinsberg et al.

U.S. Appl. No. 13/734,718, filed Jan. 4, 2013, Weinsberg et al.

Leslie et al., "User-Level Device Drivers: Achieved Performance", Journal of Computer Science and Technology, Kluwer Academic Publishers, BO, vol. 20, No. 5, Sep. 2005, pp. 654-664.

Ben-Yehuda et al., "The Price of Safety: Evaluating IOMMU Performance", Proceedings of the Linux Symposium, Jun. 2007, Retrieved from <<https://www.kernel.org/doc/ols/2007/ols2007v1-pages-9-20.pdf>>.

Liedtke J, "On U-Kernel Construction", Operating Systems Review, ACM, New York, NY, vol. 29, No. 5, Dec. 1995, pp. 237-250.

Amar, et al., "Generic Driver Model using Hardware Abstraction and Standard APIs", Retrieved on: Nov. 27, 2012, Available at: http://www.design-reuse.com/articles/18584/generic-driver-model.html.

B, Saha, "CIRUS A Scalable Modular Architecture for Reusable Drivers", In 48th ACM/EDAC/IEEE Design Automation Conference, Jun. 5, 2011, 2 pages.

"Abstract Driver Bundle", Retrieved on: Nov. 28, 2012, Available at: http://dz.prosyst.com/pdoc/mBS_Ext/um_sh/framework-ee-ad-don/bundles/device/abstractdriver/abstractdriver.html.

Katayama, et al., "A Method for Automatic Generation of Device Drivers with a Formal Specification Language", Retrieved on: Nov. 28, 2012, Available at: http://earth.cs.miyazaki-u.ac.jp/~kat/papers/pdf/iwpse98.pdf.

International Search Report & Written Opinion for PCT Patent Application No. PCT/US2014/010115, dated Apr. 4, 2014, Filed Date: Jan. 3, 2014, 12 Pages.

International Search Report & Written Opinion for PCT Patent Application No. PCT/US2014/010116, dated Apr. 8, 2014, Filed Date: Jan. 3, 2014, 10 Pages.

International Search Report & Written Opinion for PCT Patent Application No. PCT/US2014/010113, dated Apr. 3, 2014, Filed Date: Jan. 3, 2014, 11 Pages.

Office Action dated May 21, 2015 cited in U.S. Appl. No. 13/734,718.

Notice of Allowance dated Dec. 11, 2015 cited in U.S. Appl. No. 13/734,716.

Office Action dated Sep. 24, 2015 cited in U.S. Appl. No. 13/734,718.

Office Action dated Nov. 8, 2016 cited in U.S. Appl. No. 13/734,718.

Office Action dated Jun. 13, 2016 cited in U.S. Appl. No. 13/734,718.

"Office Action Issued in European Patent Application No. 14704185.9", dated Jan. 24, 2017, 5 Pages.

Office Action issued in Chinese Application No. 201480003957.X dated May 10, 2017.

Chinese Office Action issued in CN application No. 201480003948.0 dated May 18, 2017.

Office Action dated Jun. 29, 2015 cited in U.S. Appl. No. 13/734,716.

Office Action Issued in European Patent Application No. 14702317.0, dated May 17, 2017, 5 pages.

U.S. Appl. No. 13/734,718, dated Jul. 12, 2017, Office Action.

* cited by examiner

SOFTWARE INTERFACE FOR A HARDWARE DEVICE

BACKGROUND

Background and Relevant Art

Computers and computing systems have affected nearly every aspect of modern living. Computers are generally involved in work, recreation, healthcare, transportation, entertainment, household management, etc.

General purpose computing systems can utilize a number of devices by using code known as device drivers. The device drivers function as a way to interface hardware or other devices to system resources, such as CPU registers, system memory registers, etc. Device drivers typically run in kernel mode, which is a privileged mode. In particular, in kernel mode, driver code can access any memory address and control any system level component. Hence, a defective or malicious driver can readily compromise the integrity of the computing system, leading to crashes or data corruption.

Thus, device drivers are unsafe. While object oriented design methodologies, language type-safety and static code verification find their way into advanced platforms (e.g. the so-called cloud) and development environments, device drivers are still developed using unsafe languages (e.g. C/C++) and are accessed using type-less, non-object-oriented and error-prone interfaces. Most device drivers are still executed in kernel mode increasing the potential for a single software bug to cause a system failure. Further, insofar as any drivers are implemented in user mode, they are not now capable of being used for high throughput and low latency devices because, in some operating systems, hardware interrupts cannot be delivered efficiently to a user mode process. In other operating systems, the performance of a user mode driver is significantly worse than a kernel mode driver.

Hardware manufacturers typically describe the hardware in free form hardware specifications. Driver developers use these specifications to develop a hardware access layer. This layer enables a driver to interact with device registers and shared memory. Developing this layer is both tedious and error prone as it depends on the quality of the specification and developer's experience. In most cases this layer is operating system dependent and cannot be used by other platforms.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method practiced in a computing environment including acts for automatically generating code used by device drivers to interact with the hardware device. The method includes receiving a machine readable description of a hardware device, including at least one of hardware registers or shared memory structures of the hardware device. The method further includes determining an operating system with which the hardware device is to be used. The method further includes processing the machine readable description on a code generation tool to automatically generate code for a hardware driver for the hardware device specific to the determined operating system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein may include a number of techniques that facilitate the development of high-performance user mode and type safe drivers for all device types. The drivers deliver performance that is comparable to legacy kernel mode device drivers existing in other operating systems.

Figure 1:
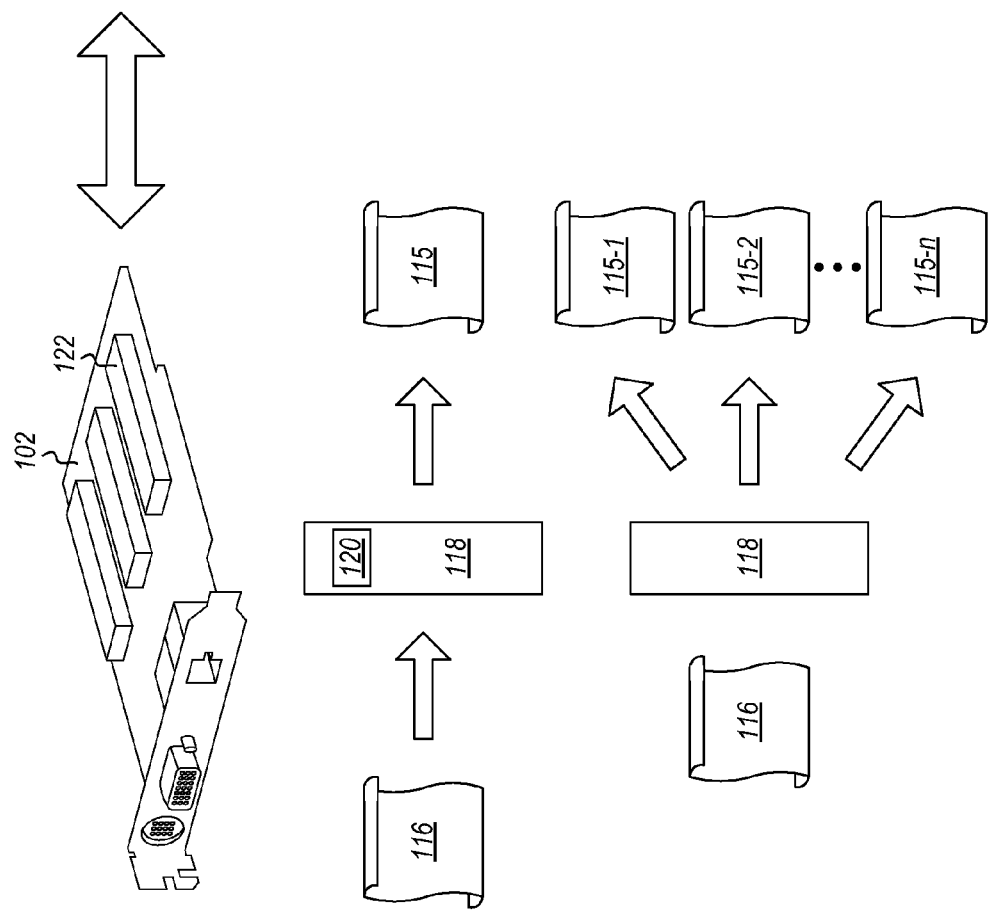
FIG. 1 illustrates device hardware and automatic device hardware abstraction layer interface generation.

Some embodiments may implement an auto-generating device driver hardware abstraction layer. As illustrated in FIG. 1, a hardware device 102 interfaces with the computing system 104 using registers 106 in the CPU 108 and shared memory 110 in system memory 112. The hardware device is typically built in a static fashion to interface with particular registers in the sets of registers 106 and with particular memory interaction. To ensure that the system 104 and the registers 106 and shared memory 110, interface properly with the hardware device 102, a driver 114 is used that provides the mapping to and from the system hardware to the device hardware. Drivers 114 are typically developed manually by using manufacturer provided textual specifications.

Hardware manufacturers typically describe the hardware in free form hardware specifications. Driver developers use these specifications to develop a hardware access layer. As noted, this layer enables a driver to interact with device registers and shared memory, such as by using direct memory access (DMA). Developing this layer is both tedious and error prone as it depends on the quality of the specification and developer's experience. In most cases this layer is operating system dependent and cannot be used by other platforms.

Some embodiments herein simplify driver development by implementing a hardware abstraction mechanism for separating the hardware access layer specification from its implementation. A machine readable hardware specification 116 can be provided by the device vendor. The machine readable hardware specification is processed by a code generation tool 118. The code generation tool 118 has operating system context for one or more different operating systems and thus can automatically create a hardware device interface layer by processing the machine readable hardware specification 116. Thus, the machine readable hardware specification 116 can be reused to create hardware device interface layers 115-1, 115-2 through 115-n for multiple different operating systems and using various different programming languages. This scheme greatly simplifies driver development and reduces the amount of errors caused by incorrect hardware access. The machine readable hardware specification 116 can be written in a simple language, such as C# and can be easily validated via inspection.

Thus, a developer or hardware manufacturer can describe the device 102 hardware registers and shared memory structures (in host memory) using a hardware-software interface language. For this purpose the developer consults the textual hardware specification. Note that a hardware engineer or the hardware vendor can also provide the hardware-software interface description of the machine readable hardware specification 116. In particular, a driver developer does not need to be involved in the hardware description phase to define the machine readable hardware specification 116 using the hardware-software interface language. In the second phase, the hardware description is processed by a code generation tool 118 that includes a hardware-software interface processor 120.

The hardware-software interface processor 120 can generate various software driver modules as illustrated below.

The hardware-software interface processor 120 can generate hardware access methods for reading/writing registers and interpreting their fields. For example, based on the machine readable hardware specification 116, the code generation tool 118 can determine what registers in the set of registers 106 are used for communicating with the hardware device 102. Methods can be generated to access these registers and can be used to provide software interfaces to application wishing to control the hardware device 102 to indicate the purpose of each register and the interpretation of data in each register.

The hardware-software interface processor 120 can generate methods for reading/writing shared structures fields. For example, based on the machine readable hardware specification 116, the code generation tool 118 can identify, in driver software modules, portions of shared memory 110 that will be used by the hardware device 102. This allows software application to use the driver 114 to be able to communicate with the portions of shared memory 110 used by the hardware device 102.

The hardware-software interface processor 120 can generate memory allocators for hardware interface entities expressed in the hardware-software interface description. For example, based on the machine readable hardware specification 116, the code generation tool 118 knows what hardware interfaces are included in the hardware device 102. The hardware interface layer 115 may be automatically generated to therefore include memory allocators to allocate memory in system memory 112 for the use of the hardware interfaces.

The hardware-software interface processor 120 can generate log modules that interpret and trace hardware interface entities. For example, based on the machine readable hardware specification 116 and knowledge about hardware interfaces of the hardware device 102, the code generation tool 118 may automatically generate the hardware interface layer 115 to include modules that are able to use the hardware interfaces to collect and log data logging hardware actions of the hardware device 102.

The hardware-software interface processor 120 can generate debugger extensions that visualize hardware interface entities. For example, based on the machine readable hardware specification 116 and knowledge about hardware interfaces of the hardware device 102, the code generation tool 118 may automatically generate the hardware interface layer 115 to include modules that are able to use the hardware interfaces to collect and log data logging hardware actions of the hardware device 102 which can be used for debugging purposes.

The following illustrates a hardware-software interface sample description of the USB EHCI controller capability registers.

---

```
/// <summary>
///     These registers specify the limits, restrictions and capabilities
of the host controller implementation.
/// </summary>
    [MemoryMappedRegister(ResourceType.MemoryRange,
Size = 0xC)]
    struct EhciCapabilityRegisters
    {
        /// <summary>
        ///     Capability Registers Length and Hci Version register
combined in a single DWORD.
        /// </summary>
        [DataField(Offset = 0x0)] public CapLengthHCIVersion
CapVer;
        /// <summary>
        ///     This is a set of fields that are structural parameters:
Number of downstream ports, etc.
        /// </summary>
        [DataField(Offset = 0x4)] public HCSPARAMS HCSPARAMS;
        /// <summary>
        ///     Multiple Mode control (time-base bit functionality),
addressing capability.
        /// </summary>
        [DataField(Offset = 0x8)] public HCCPARAMS
HCCPARAMS;
    }
```

---

As noted, the diagram shows a sample description of a USB EHCI controller registers. The register presented is the capability register. Each register is located at some offset relative to the device memory base address. In this example, the capability register is located at offset 0xC as specified by the "MemoryMappedRegister" attribute that is part of the hardware-software syntax. Once the base address of a register is set, hardware-software interface provides several attributes to present the different register fields. In this example, the "DataField" attribute is used to represent registers that are part of the capability register. For example, HCSPARAMS is a register located at offset 0x4 from the base address of the capability register (at 0xC as explained). Each data field is recursively annotated by the hardware-software interface syntax (as illustrated below).

The following illustrates a hardware-software interface description of the HCCPARAMS register field.

```
/// <summary> Host Controller Capability Parameters </summary>
[MemoryMappedRegister(Size = 4)]
struct HCCPARAMS
{
    [ReservedBits(16, 31)] public uint Reserved1;
    /// <summary>
    ///     EHCI Extended Capabilities Pointer (EECP).
    /// </summary>
    [BitField(8, 15)] public uint EECP;
    /// <summary>
    ///     Isochronous Scheduling Threshold. Default is
implementation dependent.
    /// </summary>
    [BitField(4, 7)] public ushort IsochronousSchedulingThreshold;
    [ReservedBits(3)] public uint Reserved2;
    /// <summary>
    ///     Asynchronous Schedule Park Capability. Default is
implementation dependent.
    /// </summary>
    [BitField(2)] public uint AsyncSchedulePark;
    /// <summary>
    ///     Programmable Frame List Flag. Default =
Implementation dependent.
    /// </summary>
    [BitField(1)] public uint ProgramableFrameList;
    /// <summary>
    ///     64-bit Addressing Capability.
    /// </summary>
    [BitField(0)] public bool Bit64Addressing;
}
```

This diagram shows how the HCSPARAMS register is annotated (which is part of the capability register presented above). Hardware-software interface "BitField" and "ReservedBits" attributes enable a developer to annotate the register bits. For example, bit 0 at this register indicates whether the device supports 64 addresses. The developer uses "[(BitField(0)] public bool Bit64Addressing;" to present this requirement. The generated code, will enable the developer to access the "Bit64Addressing" as a Boolean in order to query the value.

The following shows the generated code for getting/setting HCCPARAMS field values.

```
/// <summary>
///     This class represents device mapped resource.
///     It uses as a container for IO memory range and all the registers
within it.
/// </summary>
readonly struct EhciCapabilityRegisters
{
    public const int SizeInBytes = 0xc;
    readonly IoMemory m_ioRange;
    readonly int m_offset;
    public EhciCapabilityRegisters(IoMemory mem, int offset = 0)
    {
        Contract.Requires(mem != null);
        Contract.Requires(mem.Length >= SizeInBytes);
        m_ioRange = mem;
        m_offset = offset;
    }
    public ulong PhysicalAddress
    {
        get { return m_ioRange.PhysicalAddress.Value +
              (uint)m_offset; }
    }
    public Register32Control<CapLengthHCIVersion> CapVer
    {
        get { return new
Register32Control<CapLengthHCIVersion>
(m_ioRange, m_offset + 0x0); }
    }
    public Register32Control<HCSPARAMS> HCSPARAMS
    {
        get { return new Register32Control<HCSPARAMS>
(m_ioRange, m_offset + 0x4); }
    }
    public Register32Control<HCCPARAMS> HCCPARAMS
    {
        get { return new Register32Control<HCCPARAMS>
(m_ioRange, m_offset + 0x8); }
    }
}
```

The generated code uses operating system specific interfaces and can be easily generated for other operating systems.

The following illustrates the way by which the generated code is used by device driver code.

```
IoMemory mem = m_mappedIoRange.MemoryAtOffset(0,
EhciCapabilityRegisters.SizeInBytes, Access.Read);
m_capabilityRegs = new EhciCapabilityRegisters(mem);
CapLengthHCIVersion capVer = m_capabilityRegs.CapVer.Read( );
EhciEvents.CapAndHci(capVer.CAPLENGTH,
capVer.HCIMajorRevision, capVer.HCIMinorRevision);
HCSPARAMS structuralParameters =
m_capabilityRegs.HCSPARAMS.Read( );
int numberOfPorts = (int)m_structuralParameters.NumberOfPorts;
HCCPARAMS capabilityParameters =
m_capabilityRegs.HCCPARAMS.Read( );
bool is64Bit = capabilityParameters.Bit64Addressing;
if (is64Bit) { ... }
```

Once the register is initialized with the underlying memory region, a register can be easily read, manipulated and written back to the device.

In the examples illustrated above, the generated code can be used by any operating system and is not limited to a specific vendor. Additionally or alternatively, the generated code can be in any development language, such as C#, Java, C, C++, etc.

As noted, a generic hardware-software interface language is used to describe the hardware registers and host memory data structures (accessible via DMA) in a machine readable hardware specification. A code generator operates on the hardware-software interface description. The hardware-software interface description can be provided, validated and maintained by the hardware vendors. Hardware vendors can generate the machine readable hardware specification directly from a hardware design eliminating potential for any human error. This reduces or eliminates human intervention from software/hardware interface design and implementation paths, reduce development time, and provide uniformity and a better debugging experience.

Some embodiments implement capability based driver models with resource hardening. In particular, most drivers 114 interface with real hardware. To accomplish this, drivers 114 map part of the physical memory 122 that resides on the device 102 to the virtual address space of the computing system 104 or use a dedicated address space called the I/O space. The techniques illustrated previously are implemented to help ensure that driver code properly uses the mapped memory (or I/O port) for accessing the device 102. In many common operating systems, device drivers 114 can freely attempt, through error or malice, to map and use any physical address in the system memory 112. Because of the privileged nature of the driver software, the operating system typically has no way to ensure that a driver 114 does not allocate a port, interrupt, or other interface that does not belong to the driver or that is not needed for the driver to function properly to control a particular hardware device 102. For example, a keyboard driver should typically have access to IRQ 1, but does not need access to port 80. With access to port 80, a nefarious keyboard driver could implement key-logging functionality including sending keystrokes across a network to a rogue website. This can jeopardize system safety.

Embodiments herein can implement drivers and system processes in managed code, such as C# or Java. Managed code is computer program source code that will only execute under the management of a sandboxed virtual machine. As such, any drivers or system processes so implemented contain a closed object space. Device memory and registers can only be accessed via a dedicated managed object that is provided to the driver when it is initialized. Thus, the driver will only be able to access system resources and I/O processes that are needed for the driver to function properly to control a device.

Figure 2:
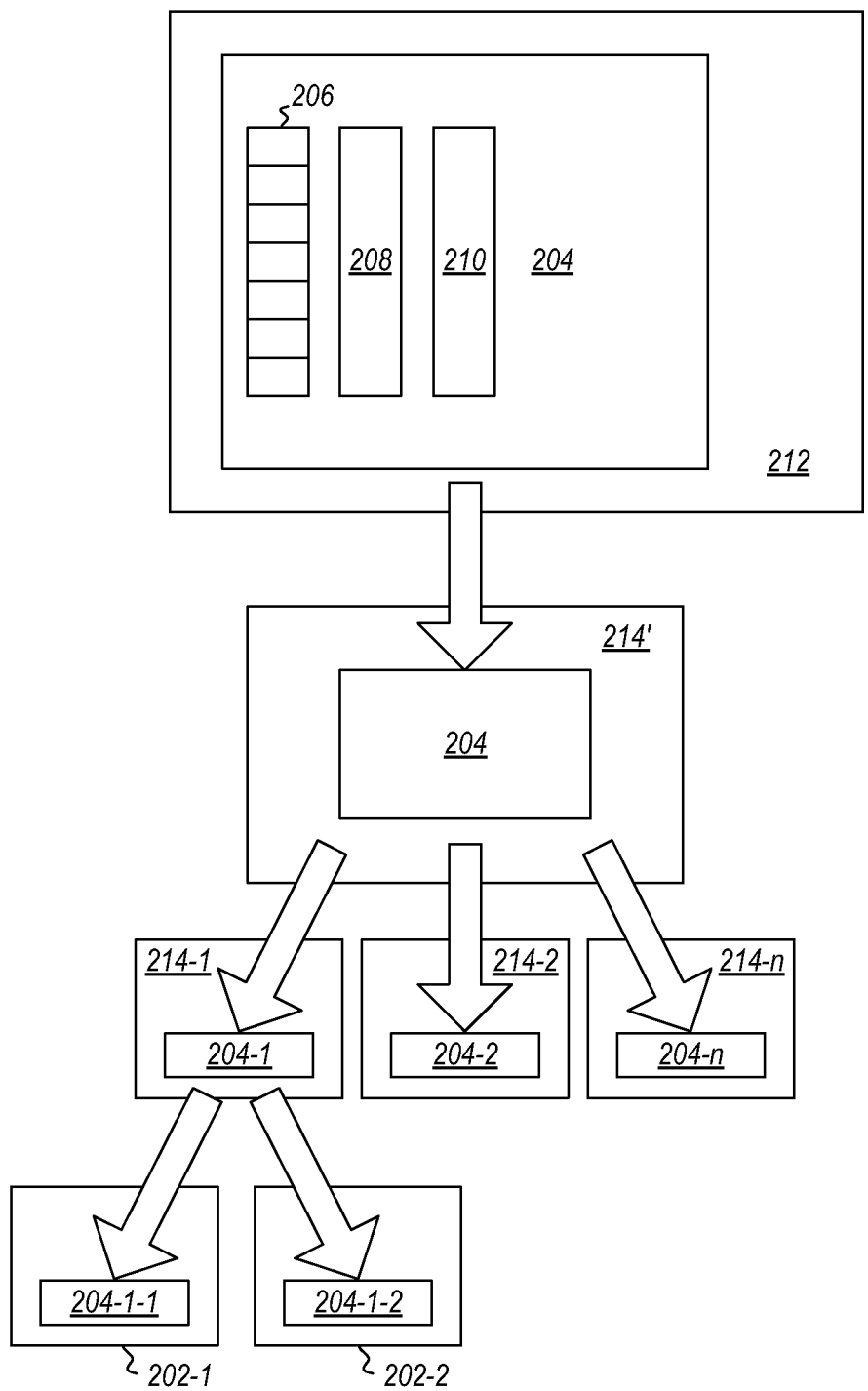
FIG. 2 illustrates hierarchical driver generation.

Referring now to FIG. 2, some embodiments implement an approach where the set 204 of all I/O resources (such as memory mapped registers 206, I/O ports 208, and DMA buffers 210) are capabilities. These capabilities are exclusively owned by the kernel 212 and are assigned to the system's root bus driver 214 upon startup. The systems root bus driver 214 can allocate subsets 204-1, 204-2 through 204-n of the set 204 of all I/O resources to other system busses 214-1, 214-2 through 214-n. The subsets 204-1 through 204-n are assigned in such a way that busses 214-1 through 214-n are only assigned resources that they need for particular devices that will be attached to them.

When bus drivers 214-1 through 214-n enumerate their devices, they assign a set of I/O resources to each child. For example, bus 214-1 has devices 202-1 and 202-1 attached to it. The bus 214-1 can assign a set 204-1-1 of I/O resources to device 202-1 and a set of resources 204-1-2 to the device 202-2, where sets 204-1-1 and 204-1-2 are subsets of set 204-1. A bus can only assign I/O resources that were assigned to it. This approach provides a hierarchical I/O resource allocation scheme that can be used to guarantee that a driver can only use or transfer resources that were assigned to it. This can greatly improve system reliability and allow the operating system to easily track and revoke any I/O resource at any time. When a driver is terminated or exits, its resources can be easily reclaimed by its parent bus driver. With an input/output memory management unit (IOMMU) hardware, this scheme can be enforced at the hardware level. For example, a driver developer trying to program a device with illegal memory addresses will not be able to jeopardize the system safety.

Figure 3:
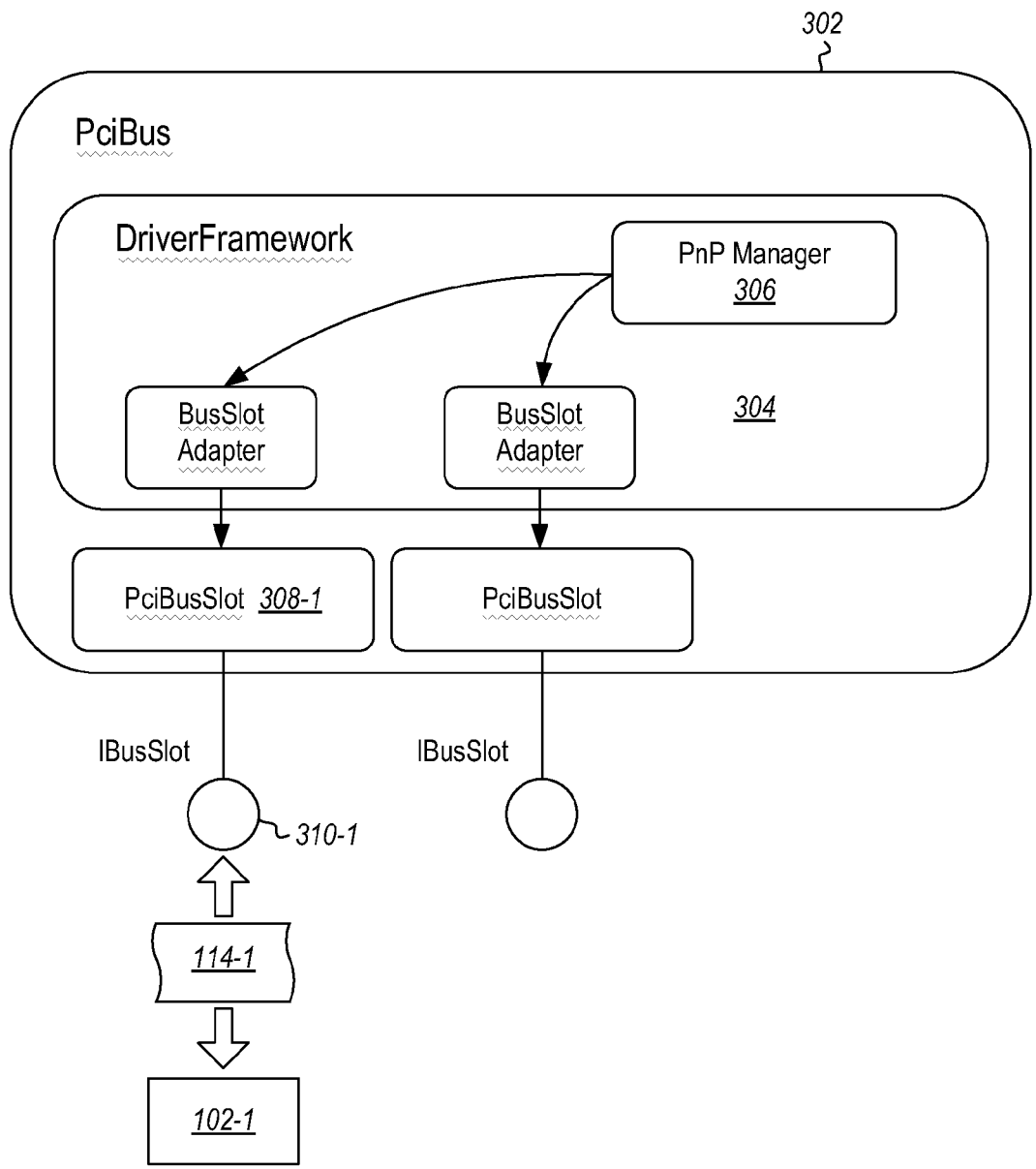
FIG. 3 illustrates a bus driver framework.

FIG. 3 illustrates the structure of a typical bus driver 302. The bus driver 302 (the PCI bus driver in this example) is linked with a user level library which provides all driver services (e.g. the DriverFramework library available from Microsoft Corporation of Redmond Washington in this example). The driver is also linked with the plug and play manager library 306 that enables a bus driver 302 to enumerate its child devices. For each enumerated device, the framework 304 creates an abstraction, called a bus slot (such as example, bus slot 308-1), which holds the assigned device's resources. Each bus driver exports multiple bus slot interfaces, such as the example bus slot interface 310-1 (denoted as IBusSlot interface) which are attached to the child drivers (illustrated by the example, 114-1) by the runtime. No other service or process can attach itself to the bus slot interface except the enumerated device driver. The bus slot interface is used by the child device driver to allocate its assigned I/O resources to a device, illustrated by the example device 102-1. A driver can only allocate I/O resources that are specified on the bus slot at the parent driver.

This mechanism can be easy to implement and distributed in the sense that I/O resource management is executed locally at each bus driver instead of in the kernel or a single system service.

Besides I/O resources that are treated as capabilities, embodiments may implement an operating system that is able to control the connectivity of various services. As drivers are treated as services embodiments can control the set of services a driver can use/interact with. For example, unlike other operating systems, in some embodiments, a driver cannot send a message to another driver as it does not have a capability to do so (which is an interface to send a message to that service). The operating system, of some embodiments, is able to constrain, control, observe, and reason about the connection of a driver to other components in the system. The combination of a capability-based model and use of managed code provides various advantages as illustrated herein.

Figure 4:
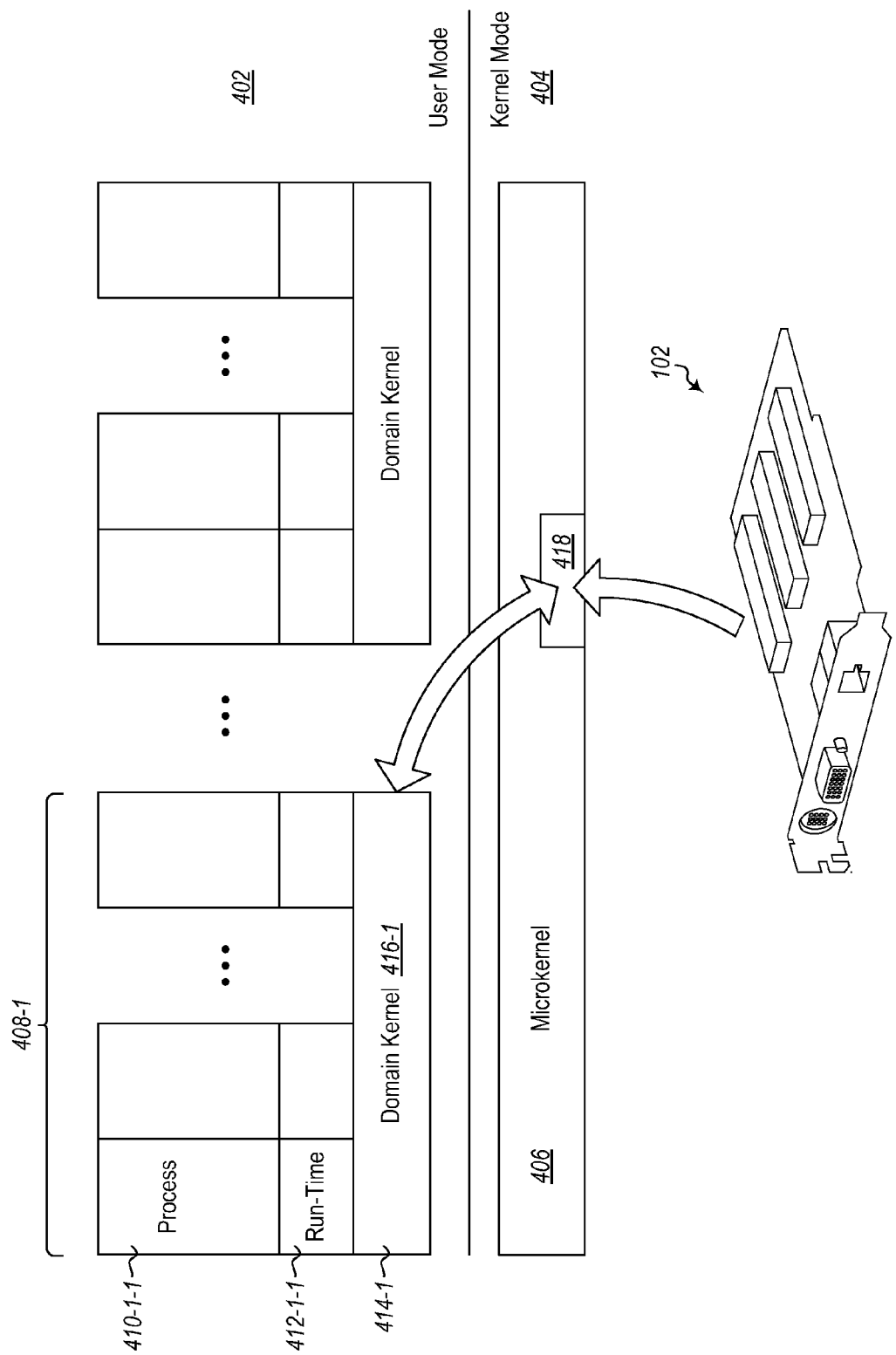
FIG. 4 illustrates driver interrupt and device communication.

With reference to FIG. 4, a unique architecture is illustrated. In the example illustrated, a user mode 402 (e.g. Ring 3, the least privileged, of the privilege rings of the x86 architecture) and kernel mode 404 are illustrated. A microkernel 406 may be implemented in the kernel mode 404 (sometime referred to as a supervisor mode). The microkernel 406 is a minimal amount of software that provides mechanisms, such as low-level address space management, thread management, and IPC communication. The microkernel 406 is responsible for reading basic hardware tables.

In user mode, 402, address spaces are divided up into domains, such as the example, domain 408-1 (but referred to herein generically as 408). The domains run various processes (such as the example process 410-1-1 but referred to generically as 410), including one or more driver processes, on a runtime (such as the example runtime 412-1-1). Embodiments may be implemented where drivers are user-mode 402 managed processes 410 (such as by coding the drivers in managed code, such as C# or Java) that can support high throughput and low latency devices. In some embodiments, all services including device drivers are developed using managed code libraries and are executed in user-mode 402. In addition, isolation among processes 410 and the microkernel 406 can be further achieved via the statically verified type safety of the language. This mechanism enables the exchange of data over inter-process communication (IPC) channels without copying as all processes reside in a single address space or domain 408. Such an approach is hard to make safe in traditional systems that are not based on type safe languages User mode drivers implemented using managed code can greatly increase system safety and simplify driver development. In particular, the developer can utilize any user-mode library that is available in the system (including XML parsers, queue management, etc.). In traditional operating systems, driver developers could not use any existing library due to memory constraints and other limitations as drivers must share their address space with the kernel. Additionally, developers no longer need to worry about memory management. The same garbage collector that manages process memory is used for drivers. Improper memory management is one of the greatest sources of operating system failures. In some embodiment systems driver memory related bugs can be eliminated.

In some example embodiments, drivers implemented as one or more processes 410, are single threaded. Thus the developer does not need to worry about synchronization, threads, and interrupt levels. Much of the driver complexity is gone and the developer is focused on the driver's functionality.

Drivers can be accessed via standard type-safe interfaces. Common operating systems restrict access to drivers to a few pre-defined functions, such as Open, Close, Read, Write and a general-purpose interface such as DeviceIoControl (known as 'ioctl'). While in previous systems, drivers controlled a few well-known hardware components and the tasks they performed were limited, this is inefficient for modem systems where at least some hardware devices (e.g. hardware accelerators such as graphics accelerators) expose an expansive and complex interface to their host. The solution provided in some embodiment operating systems treats drivers as first class-citizens.

A driver implemented as a process 410 is accessed via type safe interfaces like any other system service. Such an implementation takes advantage of a language's type-safety features and catches erroneous method invocations at compile time. To provide compile-time type checking, the compiler needs to know the data type information for the variables or expressions in the code. Interfaces provide a contract between the interface consumer and the interface implementation. The method signature can be statically checked during compilation. Mismatches of differently-typed parameters simply cannot occur in a running system. Additionally, those errors are caught by the application developer at compile time, and do not require runtime checks by the driver developer in kernel mode 404.

Besides, safety and ease of development, embodiments enable device drivers to achieve high-throughput and low latency comparable to common kernel mode device drivers. This can be achieved through the ability to implement zero-copy I/O paths. "Zero-copy" refers to the fact data entering the system is written to memory only once and then can be used directly by many layers of abstractions, both within the operating system and within application code, without the need to copy the data. Zero-copy I/O paths are ones in which the CPU does not perform copying from one memory location to another. Rather, the CPU can perform other tasks. This can save from having context switches to have the system switch between user mode 402 and kernel mode 404 to achieve the copying. The following now illustrates techniques that allow a managed, user-mode device driver to achieve such performance using zero-copy I/O paths.

Embodiments may be configured to perform efficient interrupt dispatching. The ability to efficiently deliver hardware interrupts to a user mode driver is novel. Interrupt dispatching is executed by a tight interaction between the operating system micro-kernel, the domain kernel and the drivers' framework library.

The mechanism to dispatch an interrupt uses a 3-tier architecture including an I/O interrupt manager, a driver framework library, and efficient microkernel interrupt handling.

As illustrated in FIG. 4, each domain 408 includes a domain kernel, an example of which is illustrated at 414-1 (but referred to herein generically as 414). An I/O interrupt manager, an example of which is illustrated at 416-1 (but referred to herein generically as 416) is part of the domain kernel 414 and bridges between the hardware device 102 and device driver processes 410. It is responsible for managing registrations of device drivers on the IRQs 418, dispatching interrupts to the driver processes 410, and handle interrupt sharing when an IRQ is shared by multiple devices. As all device drivers run in processes, embodiments can enforce stronger isolation and fault containment for drivers than traditional monolithic OS kernel design where device drivers run in the kernel.

The driver framework library is responsible for registering an interrupt handler at the domain kernel 414 to receive notifications. When a hardware interrupt is received at the domain kernel 414, the interrupt handler is triggered and a pre-registered driver routine is invoked. The overhead of invoking the method is very low as there is no context switch from user mode 402 to kernel mode 404 involved.

Embodiments implement efficient microkernel interrupt handling. In some embodiments, the microkernel 406 is interruptible but not preemptable. A logical processor, while running in the context of microkernel 406, can receive interrupts but cannot block or switch its context. To minimize the interrupt dispatch latency, embodiments limit the amount of time a processor can spend inside of the microkernel 406. Some embodiments implement a continuation execution scheme for system calls that potentially could take longer time than preset bounds. The bounds and continuations scheme enable the microkernel 406 to deliver interrupts to the domain kernel 414 with very low latency. All hardware interrupts (MSIs, IRQs and Virtual) are delivered to a user mode library which is part of the driver. Minimizing interrupt dispatch latency can be achieved in some embodiments by using zero-copy I/O paths.

One illustrative example of zero-copy I/O paths is now illustrated. With reference again to FIG. 1, system memory 112 is illustrated. A process 410 can allocate a portion of the system memory 112. The microkernel 406 (see FIG. 4) can allow the process 410 to allocate the memory, but once the memory is allocated to the process 410, then the process 410 has control over the portion of system memory. In a hardware driver example, a hardware device 102 can write to the portion of memory. The driver process 410 will then mark this portion of memory as immutable. Memory that is immutable is memory whose content and/or address cannot be changed. Because the portion of memory is immutable, there are no real constraints on accessing the portion of memory. Thus, the system does not need to switch to kernel mode to allow different processes to read from the memory. Thus, a driver process 410 can access the portion of memory without requiring a context switch and thus can obtain data from the hardware device 102 that writes to the portion of memory quickly and efficiently such that high efficiency and low latency can still be achieved when a driver is implemented in user mode.

The data can be delivered to the different processes 410 in appropriate ways by providing different views of the immutable portion of the memory. Thus, rather than copying the portions of the data that are needed for a particular process 410, pointers to the immutable portion of the memory can be used, and logical views of the data in the immutable portion of the memory can provide the appropriate data. Thus, from the perspective of a particular process 410, the data appears to have been copied and provided in the appropriate format while in fact, no data copying has occurred.

Similar functionality can be used for a driver process 410 to send data to a hardware device 102. In particular, a driver process 410 can write data to a portion of the system memory 112. The portion can be marked by the same driver process 410 or another driver process as immutable. The memory can then be read by the hardware device 102 without needing the system to switch to kernel mode 404.

In some embodiments, the immutable portion of memory can have a counter associated with it. Each time a process accesses the immutable portion of memory, the counter is incremented. When the process is done reading the immutable portion of memory, the counter decrements. Thus, after all processes that have been reading the immutable portion of memory finish with the immutable portion of memory, the counter is decremented to zero which allows the portion of memory to be freed up for other memory operations.

Another technique is related to the use of DMA channels for device control. A channel is a bi-directional message conduit having exactly two endpoints, called the channel endpoints. A DMA channel is a high performance mechanism to bridge the gap between applications and device drivers which exchange high volumes of packetized data via DMA. It is a specialization of a standard inter-process communication (IPC) channel, differing primarily by offering readable DMA operations and asynchronous retirement of messages in the channel. An IPC message has two parts, one mandatory and the other optional. The mandatory part is inline data copied into the channel's slot and the optional part includes handles that are transferred across (or shared over) the channel. DMA channels are unique in the following aspects:

- They are entirely executed in user-mode (where drivers and processes live).
- They provide back pressure. There is no memory allocation for each message passed between an application and network driver. Furthermore, data can stay in the channel until it's fully consumed, and messages behind this data can continue to be processed.
- They include zero-copy support. DMA can be executed from the ring buffer.
- They include support for arbitrary control messages. This enables optimizations like software segmentation offload.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
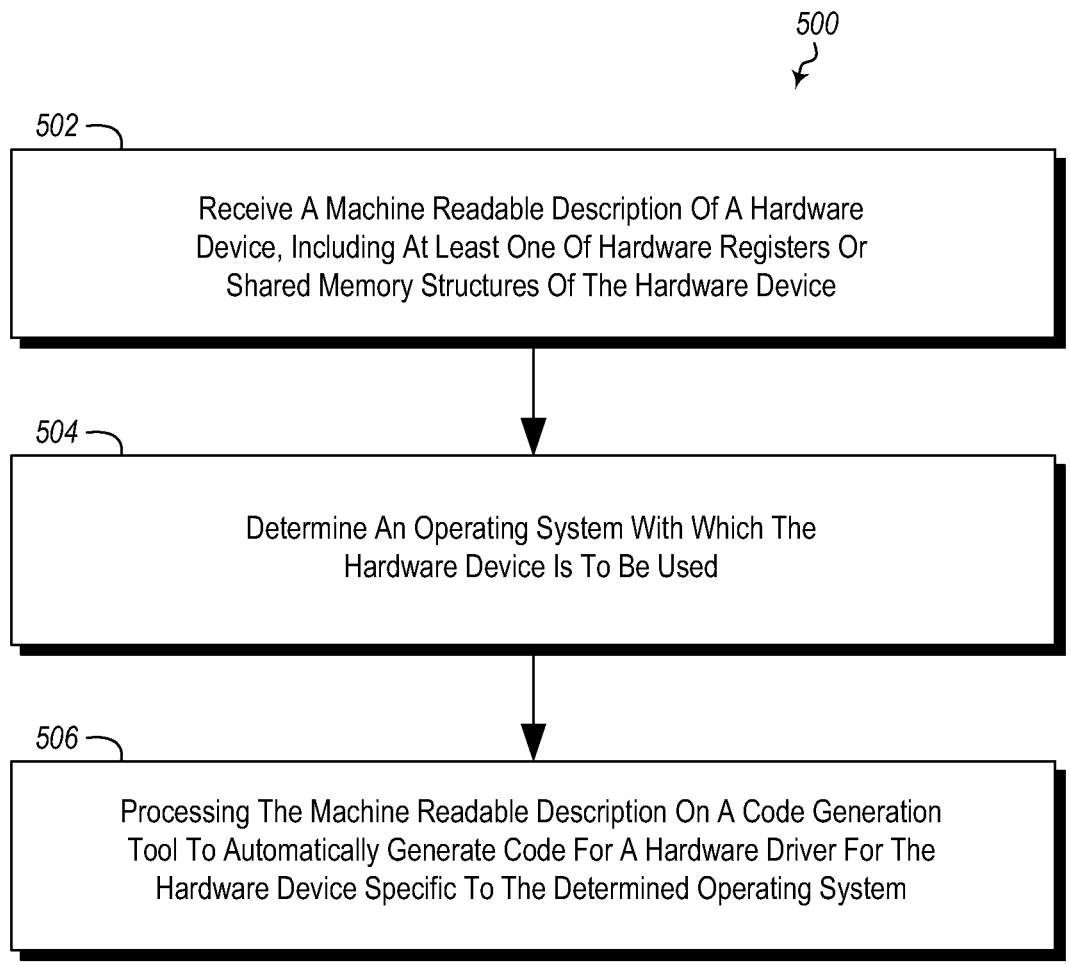
FIG. 5 illustrates a method of automatically generating code for device drivers.

Referring now to FIG. 5, a method 500 is illustrated. The method 500 may be practiced in a computing environment. The method 500 includes acts for automatically generating code used with device drivers for interfacing with hardware. The method 500 includes receiving a machine readable description of a hardware device (act 502). The machine readable description includes at least one of hardware registers or shared memory structures of the hardware device. For example, FIG. 1 illustrates an example of a machine readable description 116 of a hardware device 102.

The method 500 further includes determining an operating system with which the hardware device is to be used (act 504). For example, the code generation tool 118 may have access to, or may have information that sets the operating system for which a hardware interface layer 115 is being created.

The method 500 further includes processing the machine readable description on a code generation tool to automatically generate code for a hardware driver for the hardware device specific to the determined operating system (act 506). For example, FIG. 1 illustrates that the code generation tool 118 executes the machine readable hardware specification 116

Various driver code portions may be generated. For example, some embodiments of the method 500 may be practiced where generating code for a hardware driver comprises generating hardware access methods for reading and writing to registers and interpreting fields of the registers. Alternatively or additionally, embodiments of the method 500 may be practiced where generating code for a hardware driver comprises generating methods for reading and writing to shared structures fields. Alternatively or additionally, embodiments of the method 500 may be practiced where generating code for a hardware driver comprises generating memory allocators for hardware interface entities expressed in the machine readable description of the hardware device. Alternatively or additionally, embodiments of the method 500 may be practiced where generating code for a hardware driver comprises generating log modules that interpret and trace hardware interface entities. Alternatively or additionally, embodiments of the method 500 may be practiced where debugger extensions that visualize hardware interface entities.

Some embodiments of the method 500 may be practiced where the machine readable description of a hardware device is provided by a hardware vendor.

Some embodiments of the method 500 may be practiced where the generated code for the hardware driver is generated as managed code.

Figure 6:
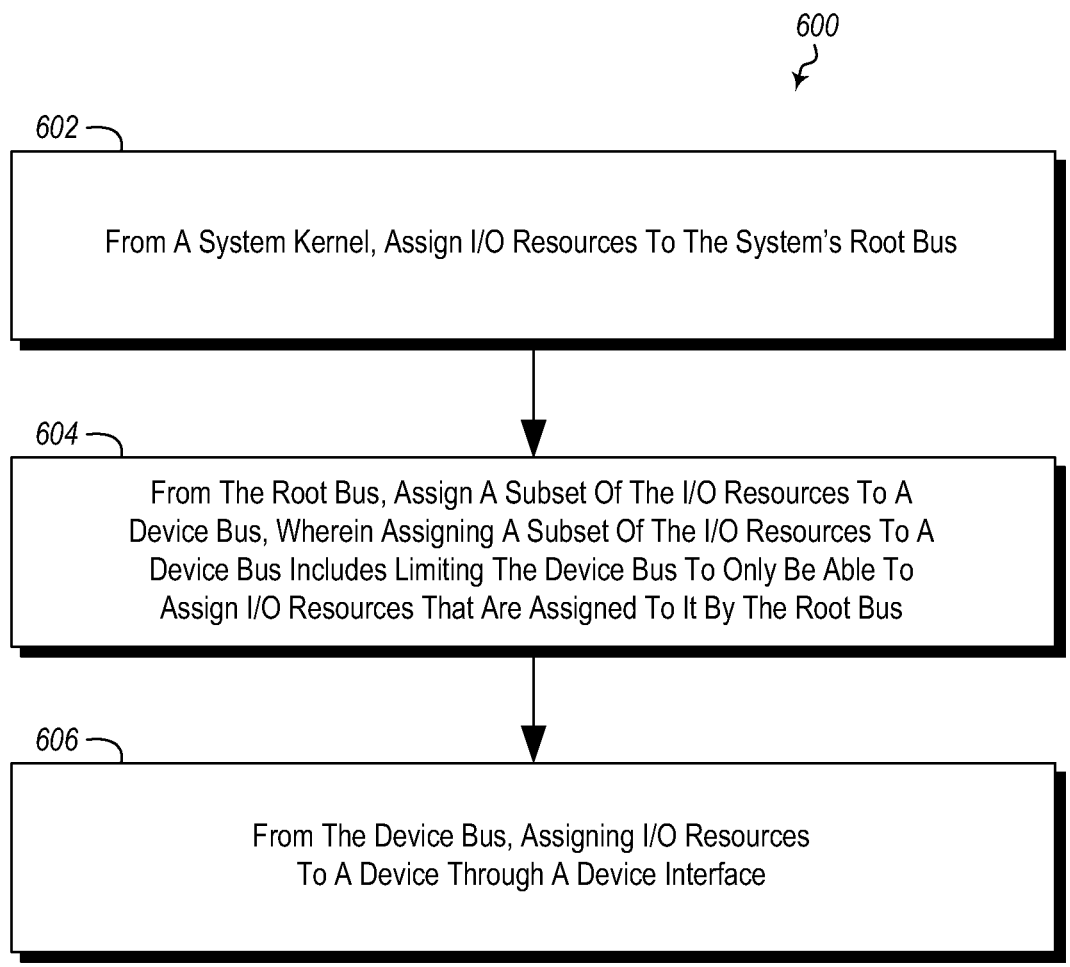
FIG. 6 illustrates a method of enforcing limitations on hardware drivers.

Referring now to FIG. 6, a method 600 is illustrated. The method 600 may be practiced in a computing environment. The method 600 includes acts for enforcing limitations on hardware drivers. The method 600 includes from a system kernel, assigning I/O resources to the system's root bus (act 602). For example, FIG. 2 illustrates that I/O resources are assigned to a system's root bus by assigning the resources to a bus driver 214.

From the root bus, the method 600 includes assigning a subset of the I/O resources to a device bus (act 604). Assigning a subset of the I/O resources to a device bus includes limiting the device bus to only be able to assign I/O resources that are assigned to it by the root bus. For example, in FIG. 2, devices busses 214-1 through 214-n have resources assigned to them. Each of these device busses is only able to further assign resources which have been assigned to them.

The method 600 further includes, from the device bus, assigning I/O resources to a device through a device interface (act 606).

Some embodiments of the method 600 may be implemented where limiting the device bus to only be able to assign I/O resources that are assigned to it by the root bus is accomplished by implementing bus drivers in managed code.

The method 600 may be practiced where assigning a subset of the I/O resources to a device bus comprises invoking a bus driver implemented in managed code.

The method 600 may be practiced where assigning I/O resources to a device comprises invoking a device driver implemented in managed code.

The method 600 may further include preventing other services and processes from attaching themselves to the device interface.

Figure 7:
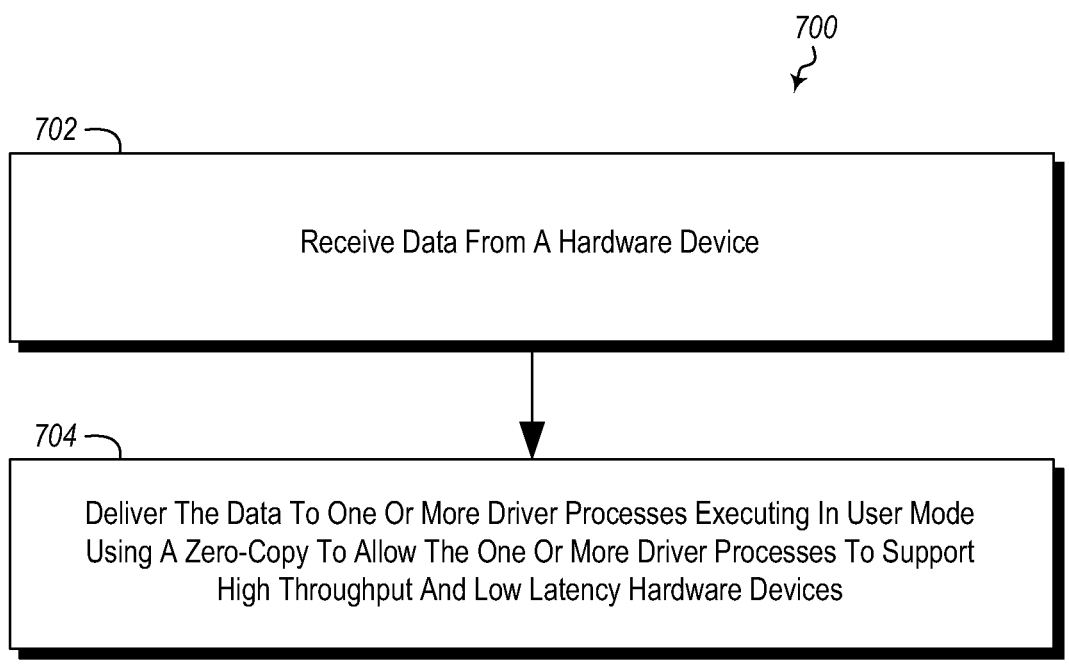
FIG. 7 illustrates a method of implementing a safe driver that can support high throughput and low latency devices.

Referring now to FIG. 7, a method 700 is illustrated. The method 700 may be practiced in a computing environment. The method 700 includes acts for implementing a type safe driver that can support high throughput and low latency devices. The method 700 includes receiving data from a hardware device (act 702). The method 700 further includes delivering the data to one or more driver processes executing in user mode using a zero-copy to allow the one or more driver processes to support high throughput and low latency hardware devices (act 704).

The method 700 may be practiced where delivering the data is performed without pre-empting the kernel mode. Alternatively or additionally, the method 700 may further include limiting the amount of time a processor spends in kernel mode. Alternatively or additionally, the method 700 may be practiced where the driver process is implemented in managed code. Alternatively or additionally, the method 700 may further include an I/O interrupt manager implemented in user mode registering user mode device drivers on interrupts. In some embodiment, the I/O interrupt manager dispatches interrupts to driver processes. Alternatively or additionally, the method 700 may further include implementing drivers as single threaded processes. Alternatively or additionally, the method 700 may be practiced where the one or more driver processes are implemented without limitation on what user mode libraries can be used to implement the one or more driver processes.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of automatically generating code used with device drivers for interfacing with hardware, the method comprising:

receiving a machine readable description of a hardware device for which a hardware driver is to be generated, the machine readable description being written in a hardware-software interface language and being reusable to create a hardware device interface for each of a plurality of different possible operating systems;

instantiating a code generation tool which has an operating system context for each of the plurality of different possible operating systems;

determining, from the plurality of different possible operating systems and prior to the hardware driver being generated, a particular operating system for which the hardware driver is to be generated and with which the hardware device is to be used; and processing the machine readable description, using the code generation tool and an operating system context for the particular operating system, to automatically generate code for the hardware driver for the hardware device, the generated code specific to the determined particular operating system and using operating system interfaces specific to the determined particular operating system.

2. The method of claim 1, wherein generating code for a hardware driver comprises generating hardware access methods for reading and writing to registers and interpreting fields of the registers.

3. The method of claim 1, wherein generating code for a hardware driver comprises generating methods for reading and writing to shared structures fields.

4. The method of claim 1, wherein generating code for a hardware driver comprises generating memory allocators for hardware interface entities expressed in the machine readable description of the hardware device.

5. The method of claim 1, wherein generating code for a hardware driver comprises generating log modules that interpret and trace hardware interface entities.

6. The method of claim 1, wherein generating code for a hardware driver comprises generating debugger extensions that visualize hardware interface entities.

7. The method of claim 1, wherein the machine readable description of a hardware device is provided by a hardware vendor.

8. A computer program product comprising one or more computer readable hardware storage devices comprising machine readable instructions that when executed by one or more processors cause one or more processors to perform the following:

receiving a machine readable description of a hardware device for which a hardware driver is to be generated, the machine readable description being written in a hardware-software interface language and being reusable to create a hardware device interface for each of a plurality of different possible operating systems;

instantiating a code generation tool which has an operating system context for each of the plurality of different possible operating systems;

determining, from the plurality of different possible operating systems and prior to the hardware driver being generated, a particular operating system for which the hardware driver is to be generated and with which the hardware device is to be used; and processing the machine readable description, using the code generation tool and an operating system context for the particular operating system, to automatically generate code for the hardware driver for the hardware device, the generated code specific to the determined particular operating system and using operating system interfaces specific to the determined particular operating system.

9. The computer program product comprising one or more computer readable storage devices of claim 8, wherein generating code for a hardware driver comprises generating hardware access methods for reading and writing to registers and interpreting fields of the registers.

10. The computer program product comprising one or more computer readable storage devices of claim 8, wherein generating code for a hardware driver comprises generating methods for reading and writing to shared structures fields.

11. The computer program product comprising one or more computer readable storage devices of claim 8, wherein generating code for a hardware driver comprises generating memory allocators for hardware interface entities expressed in the machine readable description of the hardware device.

12. The computer program product comprising one or more computer readable storage devices of claim 8, wherein generating code for a hardware driver comprises generating log modules that interpret and trace hardware interface entities.

13. The computer program product comprising one or more computer readable storage devices of claim 8, wherein generating code for a hardware driver comprises generating debugger extensions that visualize hardware interface entities.

14. The computer program product comprising one or more computer readable storage devices of claim 8, wherein the generated code for the hardware driver is generated as managed code.

15. In a computing environment, a system for automatically generating code used with device drivers for interfacing with hardware, the system comprising:

one or more processors; and computer readable memory having encoded thereon computer executable instructions that, when executed by the one or more processors, cause the one or more processors to implement a code generation tool configured to perform the following:

receiving a machine readable description of a hardware device for which a hardware driver is to be generated, the machine readable description being written in a hardware-software interface language and being reusable to create a hardware device interface for each of a plurality of different possible operating systems;

instantiating a code generation tool which has an operating system context for each of the plurality of different possible operating systems;

determining, from the plurality of different possible operating systems and prior to the hardware driver being generated, a particular operating system for which the hardware driver is to be generated and with which the hardware device is to be used; and processing the machine readable description, using the code generation tool and an operating system context for the particular operating system, on the code generation tool to automatically generate code for the hardware driver for the hardware device, the generated code specific to the determined particular operating system and using operating system interfaces specific to the determined particular operating system.

16. The system of claim 15, wherein generating code for a hardware driver comprises generating hardware access methods for reading and writing to registers and interpreting fields of the registers.

17. The system of claim 15, wherein generating code for a hardware driver comprises generating methods for reading and writing to shared structures fields.

18. The system of claim 15, wherein generating code for a hardware driver comprises generating memory allocators for hardware interface entities expressed in the machine readable description of the hardware device.

19. The method of claim 1, further comprising:

processing the machine readable description on the code generation tool to automatically generate second generated code for a second hardware driver for the hardware device, the second generated code specific to a second operating system of the plurality of different possible operating systems.

20. The method of claim 19,
wherein the generated code is in a type-unsafe language and the second generated code is in a type-safe language.

* * * * *